United States Patent
Canham (10) Patent No.: US 8,599,367 B2
(45) Date of Patent: Dec. 3, 2013

(54) APPARATUS AND METHODS FOR OBTAINING MULTI-DIMENSIONAL SPATIAL AND SPECTRAL DATA WITH LIDAR DETECTION

(75) Inventor: John S. Canham, Ellicott City, MD (US)

(73) Assignee: Alliant Techsystems Inc., Arlington, VA (US)

( * ) Notice: Subject to any disclaimer, the term of this patent is extended or adjusted under 35 U.S.C. 154(b) by 462 days.

(21) Appl. No.: 12/850,536

(22) Filed: Aug. 4, 2010

(65) Prior Publication Data

US 2012/0182541 A1 Jul. 19, 2012

(51) Int. Cl.
*G01C 3/08* (2006.01)

(52) U.S. Cl.
USPC .......... 356/5.01; 356/3.01; 356/4.01; 356/5.1

(58) Field of Classification Search
USPC ........................ 356/3.01–5.15, 6–22, 28, 28.5
See application file for complete search history.

(56) References Cited

U.S. PATENT DOCUMENTS

| | | | |
|---|---|---|---|
| 4,071,298 A | 1/1978 | Falconer | |
| 5,270,780 A | 12/1993 | Moran et al. | |
| 6,473,079 B1 | 10/2002 | Kacyra et al. | |
| 6,608,677 B1 | 8/2003 | Ray et al. | |
| 6,664,529 B2 | 12/2003 | Pack et al. | |
| 6,690,472 B2 | 2/2004 | Kulp et al. | |
| 7,023,545 B2 | 4/2006 | Slater | |
| 7,135,672 B2 | 11/2006 | Land | |
| 7,414,717 B2 | 8/2008 | Kamerman | |
| 7,440,084 B2 | 10/2008 | Kane | |
| 7,652,752 B2 | 1/2010 | Fetzer et al. | |
| 7,701,558 B2 | 4/2010 | Walsh et al. | |
| 7,940,377 B1 * | 5/2011 | Schmitt et al. | 356/5.01 |
| 2003/0174315 A1 * | 9/2003 | Byren et al. | 356/152.1 |
| 2007/0269102 A1 * | 11/2007 | Wang | 382/154 |

\* cited by examiner

*Primary Examiner* — Luke Ratcliffe
(74) *Attorney, Agent, or Firm* — TraskBritt (57) ABSTRACT

A Light Detection and Ranging (LIDAR) apparatus comprises a laser generator configured to generate an output laser signal toward a target area, at least one detector configured as an array of light sensitive elements, the array including a plurality of rows and columns of the light sensitive elements, and at least one wavelength dispersion element positioned in a return path of a returning laser signal returning from the target area. The at least one wavelength dispersion element is configured to separate wavelengths of the returning laser signal onto the plurality of rows and columns of the array, wherein the plurality of columns of the array are associated with the separated wavelengths that correspond with a position along a row of the array, the position along the row of the array corresponding with a spatial position of the target area along a first axis. Methods for scanning a target area and obtaining spectral and spatial data are disclosed herein.

18 Claims, 8 Drawing Sheets

APPARATUS AND METHODS FOR OBTAINING MULTI-DIMENSIONAL SPATIAL AND SPECTRAL DATA WITH LIDAR DETECTION

TECHNICAL FIELD

Embodiments of the present disclosure relate to Light Detection and Ranging (LIDAR) detection systems, and more specifically, to an apparatus and methods related to obtaining a multi-dimensional data set including spatial and spectral data for a target area of interest.

BACKGROUND

Light Detection and Ranging (LIDAR) is an optical remote sensing technology that measures properties of scattered light to find range and other information of a distant target. Like the similar radar technology, which uses radio waves, the range to an object is determined by measuring the time delay between transmission of a light pulse (e.g., laser) and detection of the reflected light signal. The acronym "LADAR" (Laser Detection and Ranging) is often used in military contexts and may be interchangeable with the term "LIDAR." The term "laser radar" may also be interchangeably used even though LIDAR does not employ microwaves or radio waves, which is definitional to radar.

LIDAR scanning may be employed to collect point samples on physical surfaces over large areas. In a LIDAR scanning process, a LIDAR scanning device transmits a laser signal across a scene that encompasses the target area of interest. The laser signal is reflected from the scene and captured by a detector in the LIDAR scanning device. As a result, the LIDAR scanning device measures a large number of points that lie on surfaces visible in the scene. Each scan point has a measured location in three-dimensional (3D) space (within some measurement error) that may be recorded relative to a point (x, y, z) in the local coordinate system of the LIDAR scanning device. The resulting collection of points is typically referred to as one or more point clouds. Each point cloud can include points that lie on many different surfaces in the scanned view.

A LIDAR apparatus employs a laser transmitter to transmit a pulse of light into the target area and a detector to measure the intensity scattered back from the target area. By measuring the scattering and attenuation experienced by the incident pulse of light, one can investigate the properties of the objects located in the target area. The light scattered back to the detector may result from interactions with objects within the target area located at various distances (i.e., ranges) with respect to the LIDAR apparatus. Because the light takes longer to return to the receiver from targets located farther away, the time delay of the return may be converted into a distance (range) between the objects and the LIDAR apparatus based on the speed of light. A conventional LIDAR apparatus may point the laser transmitter in various directions and at various angles with respect to the ground surface (i.e., scanning). A conventional LIDAR apparatus, however, may scan a target area in a point by point manner. That is, a detector may form an LIDAR image by scanning point by point along a row, similar to raster scan technology. Other conventional LIDAR apparatus may employ obtaining a volumetric assessment of a target area by obtaining multiple data sets from a variety of different directions. Such conventional methods may be relatively slow, expensive, and unreliable. Conventional methods may also be limited as to the number of spectral wavelengths that are detected at a single time. As a result, conventional methods may target a specific wavelength rather than obtaining a wide range of spectral data.

BRIEF SUMMARY

In some embodiments, a LIDAR apparatus comprises a laser generator configured to generate an output laser signal toward a target area, at least one detector configured as an array of light sensitive elements, the array including a plurality of rows and columns of the light sensitive elements, and at least one wavelength dispersion element positioned in a return path of a returning laser signal returning from the target area. The at least one wavelength dispersion element is configured to separate wavelengths of the returning laser signal onto the plurality of rows and columns of the array. The plurality of columns of the array are associated with the separated wavelengths that correspond with a position along a row of the array. The position along the row of the array corresponds with a spatial position of the target area along a first axis.

In additional embodiments, a method for obtaining hyperspectral imaging data correlated with spatial data is disclosed. The method comprises generating a first output laser signal toward a target area, receiving a first returning laser signal from the target area, and dispersing the first returning laser signal into a plurality of wavelengths within a field of view of a array of detector elements, wherein a column of the array views the plurality of wavelengths that correspond to a spatial location of the target area in a first axis.

In additional embodiments, a method for obtaining spatial and spectral data in a target area is disclosed. The method comprises detecting spectral data by projecting a plurality of separated wavelengths of a returning LIDAR signal returning from the target area onto columns of a LIDAR detector array, determining an x-component of spatial data by correlating locations in rows of the LIDAR detector array with a first axis of a target area, determining a z-component of the spatial data by correlating a time delay of the returning LIDAR signal with a second axis of the target area in a direction of propagation for the returning LIDAR signal, and determining a y-component of the spatial data by correlating a location of the LIDAR detector array with a third axis of the target area.

In yet another embodiment, a method for scanning a target area with a LIDAR signal is disclosed. The method comprises scanning a LIDAR signal over a plurality of scan steps at different locations along a y-axis of a target area. Each of the scan steps comprises transmitting an output laser signal along a z-axis of the target area, dispersing a returning laser signal from the target area into a spectrum of a plurality of wavelengths, time-gating at least one detector at time intervals after transmitting the output laser signal, and detecting the plurality of wavelengths during the time intervals. The at least one detector receives the spectrum of the plurality of wavelengths into columns of an array of detectors of the at least one detector, and the columns correspond to different locations along an x-axis of the target area.

BRIEF DESCRIPTION OF THE SEVERAL VIEWS OF THE DRAWINGS

While the specification concludes with claims particularly pointing out and distinctly claiming what are regarded as embodiments of the invention, advantages of the invention can be more readily ascertained from the following detailed description of some embodiments of the invention, when read in conjunction with the accompanying drawings in which:

DETAILED DESCRIPTION

In the following detailed description, reference is made to the accompanying drawings which form a part hereof and, in which is shown by way of illustration, specific embodiments in which the invention may be practiced. These embodiments are described in sufficient detail to enable those of ordinary skill in the art to practice the invention. It is to be understood that other embodiments may be utilized, and that structural, logical, and electrical changes may be made within the scope of the disclosure.

In this description, specific implementations shown and described are only examples and should not be construed as the only way to implement the present invention unless specified otherwise herein. It will be readily apparent to one of ordinary skill in the art that the various embodiments of the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

Referring in general to the following description and accompanying drawings, various embodiments of the present invention are illustrated to show its structure and method of operation. Common elements of the illustrated embodiments may be designated with similar reference numerals. It should be understood that the figures presented are not meant to be illustrative of actual views of any particular portion of an actual structure or method, but are merely idealized representations employed to more clearly and fully depict the present invention defined by the claims below.

It should be appreciated and understood that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

It should be further appreciated and understood that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and steps are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the invention described herein.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. A reference to first and second elements does not mean that only two elements may be employed there or that the first element must precede the second element in some manner. Also, unless stated otherwise a set of elements may comprise one or more elements.

There is reference in this disclosure to spectral data and spatial data. Spectral data refers to data that relates to characteristics of a signal, including wavelengths, frequency, intensity, etc. Spatial data refers to three-dimensional (3D) positional data. At times, the terms "x-axis," "y-axis," "z-axis," "x/y plane," "x-component," "y-component" or "z-component" may be used, which terms are intended to be merely labels that are relative to each other, and are not intended to indicate any particular direction within a target area. The x-axis, y-axis, and z-axis may be used to describe the 3D spatial data of a multi-dimensional data cube, such as describing the width, height, and depth of the data cube. While it is not intended as a limitation, throughout this description, the x-axis refers to an axis in a direction of a row within an array of light sensitive elements of a LIDAR detector, the y-axis is orthogonal to the x-axis and refers to an axis in the direction of movement of a LIDAR apparatus, and the z-axis is orthogonal to the x-axis and the y-axis and refers to an axis in a direction of propagation for the output laser signal. An x-, y-, or z-component refers to a location (i.e., position, cell, etc.) along the respective axis. Likewise, a "horizontal axis" and a "vertical axis" are intended as labels and relative directions and are not intended to be limited to any specific configuration or location within a target area.

In this disclosure, a laser signal may be referred to as having certain characteristics such as wavelength and frequency. It is recognized that the relationship between wavelength ($\lambda$) and frequency (f) is $\lambda = v/f$, where v is the velocity of the wave, which is the speed of light in the case of a laser signal. As a result, shifting the frequency also shifts the wavelength. Additionally, separating a signal into individual frequencies also separates the signal into individual wavelengths.

Figure 1:
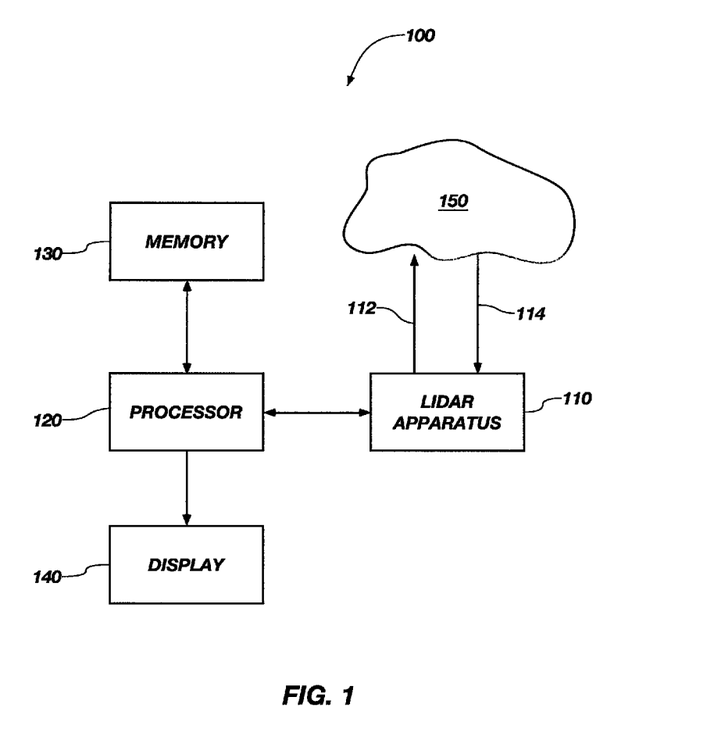
FIG. 1 is a schematic representation of a multi-dimensional spatial and spectral data acquisition system according to an embodiment of the present invention.

FIG. 1 is a schematic representation of a multi-dimensional spatial and spectral data acquisition (MSSDA) system 100 according to an embodiment of the present invention. MSSDA system 100 includes a LIDAR apparatus 110, processor 120, memory 130, and display 140. The processor 120 may be coupled with the LIDAR apparatus 110, memory 130, and display 140. The processor 120 may include control logic configured to control the operations of the LIDAR apparatus 110, memory 130, and display 140, and to control the related operations of data acquisition, data processing, data analysis, data storage, and display of data.

In operation, LIDAR apparatus 110 transmits an output laser signal 112 toward a target area 150 about which spatial and spectral information may be desirable. The output laser signal 112 may interact with objects (e.g., trees, buildings, molecules, aerosols, etc.) within the target area 150. The interaction of output laser signal 112 with such objects may generate a returning laser signal 114 that may include, for example, reflected light, refracted light, scattered light, fluoresced light, and combinations thereof. The LIDAR apparatus 110 detects and receives the returning laser signal 114.

Once detected, the data received from the returning laser signal 114 may be processed, analyzed, stored, or combinations thereof. For example, the data may be stored in the memory device 130. The analysis may occur off-line (i.e., not in real time). As another example, the data may be processed and analyzed on-line (i.e., in real time). The raw, processed, or analyzed data may also be output (e.g., displayed) by display 140 or by some other appropriate peripheral output device (e.g., printer).

The MSSDA system 100 may be associated with terrestrial-, airborne-, and space-based platforms using either a moving platform or scanner mounting. The MSSDA system 100 may be employed in the detection of pollution sources, military and other vehicles, personnel hidden from view, missiles, rockets, rocket-propelled grenades, improvised explosive devices, potential biological warfare agents, chemical warfare agents, identification of spacecraft emissions for identification of potential composition, HazMat detection, environmental compliance, real-time automotive emissions testing, and other applications in which detection of spatial and spectral data of an object may be desirable.

Figure 2:
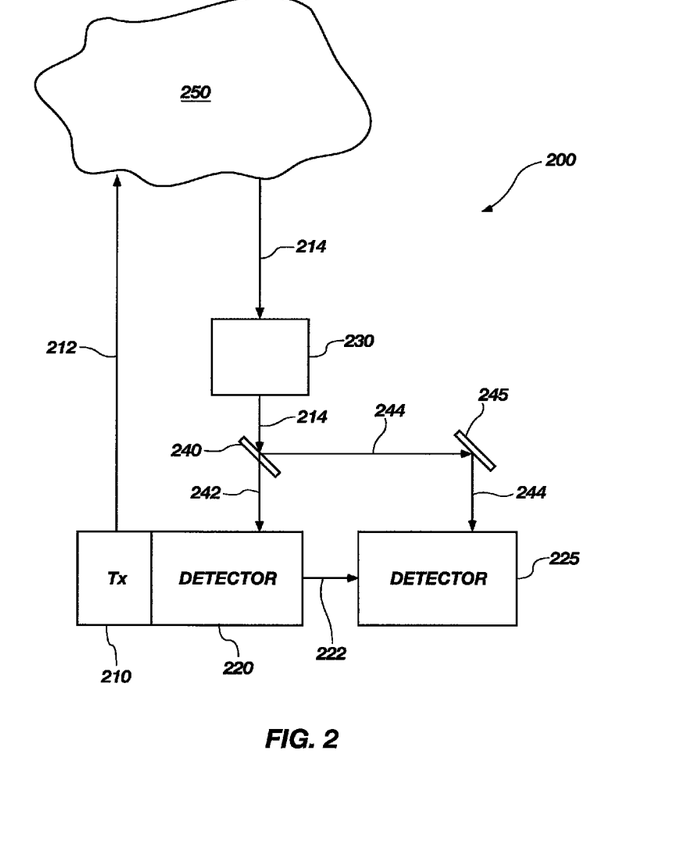
FIG. 2 is a schematic of a LIDAR apparatus according to an embodiment of the present invention.

FIG. 2 is a schematic of a LIDAR apparatus 200 according to an embodiment of the present invention. For example, LIDAR apparatus 200 may be employed as the LIDAR apparatus 110 in the MSSDA system 100 of FIG. 1. The LIDAR apparatus 200 includes a laser transmitter (Tx) 210, a first LIDAR detector 220, a second LIDAR detector 225, optics 230, a first wavelength dispersion element 240, and a second wavelength dispersion element 245. The optics 230 and the first and second wavelength dispersion elements 240, 245 may be located in a return path of the first and second LIDAR detectors 220, 225, respectively. The first wavelength dispersion element 240 may be associated with the first LIDAR detector 220 and the second wavelength dispersion element 245 may be associated with the second LIDAR detector 225.

The first LIDAR detector 220 and the second LIDAR detector 225 may be coupled to each other through sync line 222.

In operation, the laser transmitter 210 generates and transmits an output laser signal 212 toward a target area 250 (i.e., scene). The output laser signal 212 may be a sufficiently intense and mode-controlled laser beam. The laser transmitter 210 may generate laser pulses with a wavelength corresponding to a desired application. For example, the output laser signal 212 may exhibit a wavelength in the near-infrared spectrum; however, other ranges of wavelengths are contemplated. The output laser signal 212 may interact with objects within the target area 250 and may experience frequency shifts due to Raman scattering. Frequency shifts may also be due to fluorescence, photo-induced chemical frequency shifts and light-induced frequency shifts. The output laser signal 212 may also potentially experience Rayleigh scattering, dependent upon the particle size, particle density, and atmospheric aerosol densities. As a result, the output laser signal 212 may be one or more of reflected, refracted, scattered, and fluoresced, in order to generate the returning laser signal 214. As a result, the total spectrum of the returning laser signal 214 may include contributions that are frequency shifted due to Raman scattering and contributions that are at or near the wavelength of the output laser signal 212 due to Rayleigh scattering.

The returning laser signal 214 may enter optics 230. The optics 230 may be configured to generate a relatively high reproducibility laser signal with a relatively high spectral resolution in order to increase the amount of light captured by the first and second LIDAR detectors 220, 225. For example, the optics 230 may include one or more imaging reflectors such as parabolic reflectors or reflector telescopes, other light collecting devices, or combinations thereof. Of course, the amount of light captured by the first and second LIDAR detectors 220, 225 may also be increased additionally, or alternatively, by increasing the magnitude of the output laser signal 212 in order to increase the amount of light reflected and scattered to form returning laser signal 214. The optics 230 may also convert the returning laser signal 214 into a different form. For example, a linear parabolic reflector (e.g., lens) may be configured to convert the returning laser signal 214 from a one form (e.g., circular, spherical, etc.) of a distribution of light to a different form (e.g., linear) of a distribution of light. In other words, the returning laser signal 214 may be focused into a linear form of a distribution of light.

The returning laser signal 214 may also interact with the first wavelength dispersion element 240. The first and second wavelength dispersion elements 240, 245 may be any element that disperses (e.g., separates, splits, etc.) light by the frequency of the light. For example, the first and second wavelength dispersion elements 240, 245 may each include a diffraction grating including slits that disperse light signals into individual wavelengths or groups of wavelengths depending on the resolution. The first and second wavelength dispersion elements 240, 245 may include other light dispersing elements, such as a prism. As a result, the first wavelength dispersion element 240 may be configured to separate the returning laser signal 214 into a Raman signal 242 and a Rayleigh signal 244. In other words, the first wavelength dispersion element 240 splits the Rayleigh signal 244 (i.e., at the original laser frequency) from the Raman signal 242 (i.e., the frequency-shifted laser frequencies). The first wavelength dispersion element 240 may also separate the spectrum (e.g., through diffraction) of the Raman signal 242 into individual frequencies for detection by the first LIDAR detector 220. As a result, the non-diffracted portion of the returning laser signal 214 may be the Rayleigh signal 244, and the primary portion of the diffracted returning laser signal 214 may be the Raman signal 242. The Raman signal 242 may be frequency shifted relative to the output laser signal 212 due to Raman scattering, fluorescence, photo-induced chemical and light-induced frequency shifts. The Rayleigh signal 244 may be due to reflection and refraction of the light, dependent upon the particle size, particle density, and atmospheric aerosol densities. The second wavelength dispersion element 245 may also separate the spectrum (e.g., through diffraction) of the Rayleigh signal 244 into individual frequencies for detection by the second LIDAR detector 225.

The first LIDAR detector 220 receives the Raman signal 242 and the second LIDAR detector 225 receives the Rayleigh signal 244. Of course, it is contemplated that the first wavelength dispersion element 242 may be configured to direct a Rayleigh signal to the first LIDAR detector 220 and direct a Raman signal to the second LIDAR detector 225. The first and second LIDAR detectors 220, 225 may include an avalanche photodiode array with appropriate detection electronics (e.g., Flash LIDAR detectors). For example, such a Flash LIDAR detector is available from Advanced Scientific Concepts, Inc. of Santa Barbara, Calif.

While the LIDAR apparatus 200 is shown as having only two wavelength dispersion elements 240, 245, more or fewer wavelength dispersion elements may be employed. For example, in one embodiment only one of the Raman signal 242 and the Rayleigh signal 244 may be obtained and detected by a LIDAR detector. In another embodiment, additional wavelength dispersion may be desired for one or both of the Raman signal 242 or the Rayleigh signal 244, which additional wavelength dispersion may be accomplished by increasing the number of wavelength dispersion elements employed. For example, Rayleigh scattering may be present within a narrow frequency band at or near the frequency of the output laser signal 212. Depending on the desired application, one or more additional wavelength dispersion elements (not shown) may be employed to increase the resolution (i.e., wavelength dispersion) of the Rayleigh data. More or fewer LIDAR detectors may also be employed depending on the application.

The LIDAR apparatus 200 may be configured to obtain 3D spatial data that includes additional spectral data for objects within the target area 250. In other words, a higher dimensional data cube may be formulated that includes chemical compositional data (from Raman signal 242) and particulate size data (from Rayleigh signal 244) that correspond to a 3D spatial point for a particular target area 250. With the Raman signal 242 being directed to the first LIDAR detector 220 and the Rayleigh signal 244 being directed to the second LIDAR detector 225, a plurality of data sets may be obtained by the LIDAR apparatus 200. A first data set may include chemical composition data (derived from the Raman signal 242) that corresponds to spatial points in a 3D space of the target area 250. A second data set may include particulate size data (derived from the Rayleigh signal 244) that corresponds to spatial points in the 3D space of the target area 250. The higher dimensional data cube may be formulated by combining the data sets. For example, a four-dimensional (4D) data cube may include the 3D spatial data and either the Raman data or the Rayleigh data. A five-dimensional (5D) data cube may include the 3D spatial data and both the Raman data or the Rayleigh data. Depending on wavelength dispersion and the different data received through embodiments of the present invention, other higher dimensional data cubes may be formulated.

For the data from the first LIDAR detector 220 and the second LIDAR detector 225 to be combined, it may be desirable for the data to be taken concurrently or at least substantially concurrently over a same target area. The first LIDAR detector 220 and the second LIDAR detector 225 may be operably coupled via sync line 222. The sync line 222 may enable the first LIDAR detector 220 and the second LIDAR detector 225 to view the respective portions (e.g., Raman signal 242, Rayleigh signal 244) of the returning laser signal 214 at least substantially at the same time.

The LIDAR apparatus 200 may be employed for the determination of the chemical and particle compositions of a target area 250 in a 3D manner while being mounted on a stationary or moving platform from terrestrial, airborne and spaceborne locations. Obtaining such data may allow the determination of source locations and drift patterns of the gases of interest and the particles of interest, depending upon the Raman scattering efficiencies and Rayleigh scattering of the target molecules. Appropriate laser frequency and intensity selection may allow enhancement of the detection capabilities of the LIDAR apparatus 200, resulting in a keying in of the system for a specific application.

Figure 3:
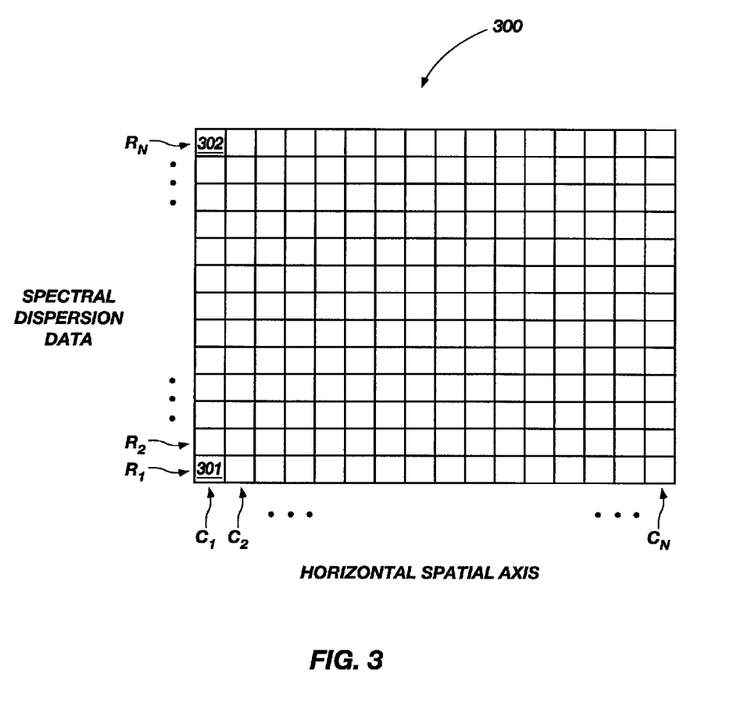
FIG. 3 is a schematic representation of a detector employed in a LIDAR apparatus according to an embodiment of the present invention.

FIG. 3 is a schematic representation of a LIDAR detector 300 employed in a LIDAR apparatus according to an embodiment of the present invention. For example, LIDAR detector 300 may be employed as one of the LIDAR detectors 220, 225 in the LIDAR apparatus 200 of FIG. 2. The LIDAR detector 300 may be configured as an array of light sensitive elements (i.e., cells, pixels, etc.). For example, cells (e.g., 301, 302, etc.) may be arranged in an array of columns (e.g., $C_1$-$C_N$) and rows (e.g., $R_1$-$R_N$). Specifically, FIG. 3 illustrates obtaining the spectral data as well as obtaining the x-component of 3D spatial data.

A conventional use of a LIDAR detector 300 with an array of light sensitive elements (e.g., cells 301, 302, etc.) may be to obtain a full 3D spatial image of the target area 250 (FIG. 2), such that the data in each cell (e.g., 301, 302) represents only spatial data. That is, the entire image detected by the LIDAR detector 300 correlates with the entire target image for the field of view of the target area 250 in a one-to-one manner. As a result, the LIDAR detector 300 takes a picture of the target area 250 and the array of light sensitive elements (e.g., cells 301, 302, etc.) have an x-component and a y-component according to a location within the array. In other words, the data in cell 301 represents the data with x- and y-components in the bottom left portion the target image. Likewise, the data in cell 302 represents the data with x- and y-components in the upper left portion of the target image, and so on.

In contrast, in embodiments of the present invention, LIDAR detector 300 may be employed in order to obtain spectral data in addition to spatial data. As previously discussed with reference to the components of FIG. 2, when the returning laser signal 214 passes through optics 230 and the first wavelength dispersion element 240, the resulting Raman signal 242 may be converted to a line as to the spatial data along the vertical axis of the LIDAR detector 300. As a result, the horizontal axis correlates to the locations along the x-axis of the target area 250. The spectral data for each x-component may be converted to a perpendicular line in the vertical axis of the LIDAR detector 300. The horizontal axis of the LIDAR detector 300 is labeled in FIG. 3 as the "Horizontal Spatial Axis" and the vertical axis is labeled as the "Spectral Dispersion Data."

As a result, each cell (e.g., 301, 302, etc.) of the LIDAR detector 300 may not necessarily detect data that corresponds to a spatial point in the x/y plane of the image of the target area 250. Instead, the horizontal axis of the LIDAR detector 300 array may still represent a spatial location of the target area 250 for one of the axes (e.g., the horizontal x-axis); however, the vertical axis of the LIDAR detector 300 array may detect data that represents the dispersed spectral data for the x-component corresponding to that particular column. In other words, the data for the y-axis for the target area 250 may not be seen by the LIDAR detector 300 at this time. As an example, column $C_1$ (which includes cells 301, 302) may still provide information regarding a spatial point in the x-axis, but the data within the cells includes spectral data that has been separated into individual frequencies. In other words, each row ($R_1$-$R_N$) may correspond to a different frequency of the total spectrum corresponding to the spatial point in the x-axis. The number of wavelengths (i.e., sub-colors) that are separated may be relatively high depending on the resolution of the LIDAR detector 300 and resolution of the wavelength separation. For example, as many as hundreds or thousands of separated wavelengths are contemplated. As a result, a plurality of wavelengths may be separated in order to obtain a hyper-spectral image in a 3D space.

Thus, the cell 302 no longer views data that corresponds to the spatial point in the upper left portion of the target image, but one of the many frequencies separated from the total spectrum corresponding to the particular x-component. The spatial point along the y-axis may be determined as described with reference to FIG. 5.

Figure 4:
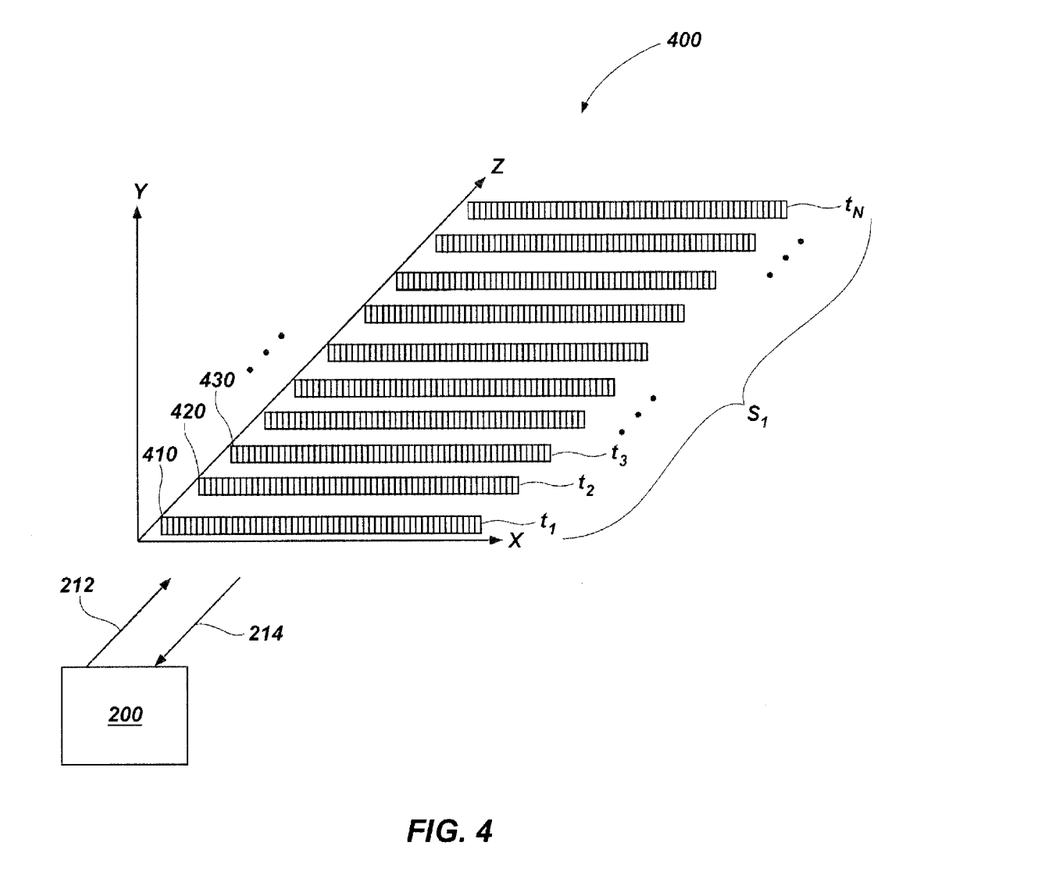
FIG. 4 is a schematic representation of data obtained by a LIDAR apparatus according to an embodiment of the present invention.

FIG. 4 is a schematic representation of data 400 obtained by a LIDAR apparatus 200 according to an embodiment of the present invention. Specifically, FIG. 4 represents obtaining the z-component of the 3D spatial data. Each of data lines 410-430 (and so on) are part of an individual scan step $S_1$, as will be further described with reference to FIG. 5. Each cell in each data line 410-430 corresponds to a specific x-component location for the 3D spatial data. Each cell in each data line 410-430 also includes its own corresponding spectral data as described with reference to FIG. 3; however, the spectral data is not shown so as not to obscure the figure with unnecessary detail. During a single scan step (e.g., scan step $S_1$) the LIDAR apparatus 200 transmits an output laser signal 212. As previously described, the output laser signal 212 may be a pulsed beam at a desired frequency. As the output laser signal 212 propagates along the z-axis, the output laser signal 212 may interact with objects in the target area, which interaction may generate a returning laser signal 214. The returning laser signal 214 may include Raman and Rayleigh data, which may be separated and directed to different LIDAR detectors as previously described herein.

The LIDAR detectors 220, 225 (FIG. 2) are time gated, such that at a discrete time interval (e.g., time $t_1$-$t_N$) the LIDAR detectors 220, 225 are enabled and detect the light projected thereon. At a known time instance after the pulse of the output laser signal 212, a distance along the z-axis can be determined, which distance corresponds to the distance from the LIDAR detectors 220, 225 that a given interaction occurred in order to generate the returning laser signal 214.

For example, at time $t_1$ the LIDAR detectors 220, 225 may be enabled to detect the returning laser signal 214 generated by an interaction at a spatial point within the target area. As a result, the corresponding spectral and spatial data detected by the LIDAR detectors 220, 225 may be converted to a corresponding distance from the LIDAR detectors 220, 225 in order to obtain the z-component of the 3D spatial data. As a further example, if the spectral and spatial data represented by data line 410 was obtained at time $t_1$=20 nanoseconds (ns), the interaction that generated the returning laser signal 214 may have occurred at approximately 10 feet from the LIDAR detectors 220, 225. At time $t_2$, the LIDAR detectors 220, 225 may again be enabled to detect light interactions at a further distance from the LIDAR detectors 220, 225. If the spectral and spatial data represented by data line 420 was obtained at time $t_2$=40 ns, the interaction that generated the returning laser signal 214 may have occurred at approximately 20 feet from the LIDAR detectors 220, 225. The time gating may continue for instances of time $t_3$-$t_N$ for a sufficient amount of time in order to obtain a desired total depth into the target area. The time intervals may be determined by a desired depth resolution for the spacing between readings. The time intervals $t_1$-$t_N$ may be uniformly separated; however, it is contemplated that the time intervals $t_1$-$t_N$ be enabled according to other desired time-gating schemes. For these examples, it is assumed that light travels approximately 1 foot/ns according to the speed of light. Thus, light that is detected by the LIDAR detectors 220, 225 after 20 ns corresponds to light that was reflected at about 10 feet away (20 feet round trip) from the LIDAR detectors 220, 225.

At the end of the time-gated time intervals (i.e., $t_N$), a scan step (e.g., $S_1$) may be completed. In other words, a scan step (e.g., $S_1$) represents spatial and spectral data retrieval for a single y-component over all recorded values along the x-axis and z-axis. In order to obtain more than one reading in the spatial direction of the y-axis, the LIDAR apparatus 200 may be displaced to a new position along a direction of the y-axis. At a new position along the y axis, an additional scan step may be performed in order to obtain a more full view of the target area, as will be shown in FIG. 5.

Figure 5:
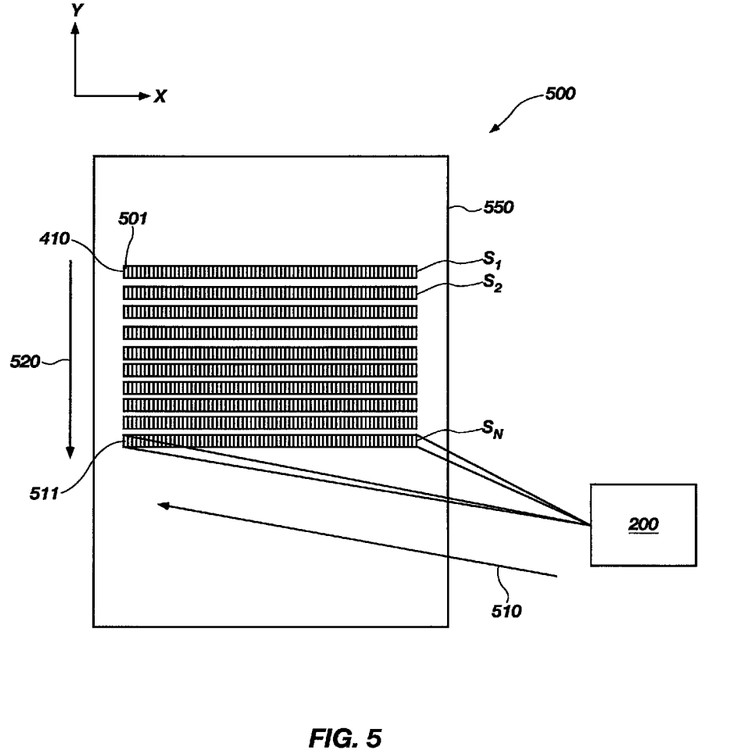
FIG. 5 is a schematic representation of data obtained by a multi-dimensional spatial and spectral data acquisition system according to an embodiment of the present invention.

FIG. 5 is a schematic representation of data obtained by a MSSDA system 500 according to an embodiment of the present invention. MSSDA system 500 includes the LIDAR apparatus 200 of FIG. 2 that receives spatial and spectral data from a target area 550. Specifically, FIG. 5 illustrates obtaining the y-component of the 3D spatial data. As FIG. 5 is intended to show spatial data, the spectral data is not depicted in order to not obscure FIG. 5 with unnecessary detail. It is noted, however, that each cell (represented in FIG. 5 as a sub-box of the scan step rows labeled $S_1$-$S_N$) also includes its own spectral data as described in reference to FIG. 3. Likewise, the scan steps ($S_1$-$S_N$) may also include additional data sets for the z-components of the spatial data, which additional data sets are also not shown in FIG. 5 (see FIG. 4 for discussion of z-component data). One could imagine, however, that additional data sets exist behind each scan step labeled $S_1$-$S_N$. The additional data sets behind rows may extend into the figure and represent the spatial and spectral data at different distances along the z-axis and are shown and further discussed with reference to FIG. 4. Thus, the rows (e.g., data line 410) shown in FIG. 5 may correspond to the first row (e.g., data line 410) detected at time $t_1$ (FIG. 4) for a given scan step (e.g., S1).

LIDAR apparatus 200 obtains data as previously discussed. Each row represents a scan step $S_1$-$S_N$ of the target area 550. A scan step $S_1$-$S_N$ may include the spectral data for each position on the x-axis at time-gated intervals as the output laser signal 212 (FIG. 2 and 4) propagates along the z-axis. For example, data in scan step $S_1$ may have been the first data set collected by the LIDAR apparatus 200. At the conclusion of scan step $S_1$, the LIDAR apparatus 200 may be displaced to a new location in the y-axis (indicated by arrow 520), and an additional set (e.g., scan step $S_2$) of spectral and spatial data are obtained as described with reference to FIGS. 2-4. Thus, data obtained in scan step $S_2$ may have been the second data set collected by the LIDAR apparatus 200. In order to obtain the y-component of the 3D spatial data, the LIDAR apparatus 200 may be displaced in a direction perpendicular to the x-axis direction as defined by the orientation of the LIDAR detectors 220, 225 of the LIDAR apparatus 200. Such a perpendicular direction may also be referred to as a "push broom" direction across the target area 550. The LIDAR apparatus 200 may be displaced in the push broom direction by being mounted upon a movable platform (e.g., gimbal, scanner, etc.), by being mounted upon a stationary platform of a moving object (e.g., aircraft, spacecraft, etc.), or a combination thereof. As a result of knowing a position of the LIDAR apparatus 200, a y-component for the 3D spatial data may be determined.

In summary, as the LIDAR apparatus 200 is displaced along the y-axis the spectral data may be obtained across the target area 550 along with the 3D spatial data. The x-component may be determined according to the known positions in the direction of the data line detected by the LIDAR detectors 220, 225 (FIGS. 2 and 4). The z-component may be obtained for the different data sets in the time domain and converted to a distance along the z-axis (indicated by arrow 510). The y-component may be determined according to the known position of the LIDAR apparatus 200 as the LIDAR apparatus is displaced to view the target area 550. As previously described with reference to FIG. 3, the cells (e.g., 501, 511) in the nominal vertical direction on the LIDAR detector 300 itself are employed to detect the spectral distribution from the either the Raman or Rayleigh signals. For embodiments that have a plurality of LIDAR detectors to obtain both Raman and Rayleigh data, the Raman and Rayleigh data may be combined to generate a higher-level data cube that includes 3D spatial data along with both Raman and Rayleigh data. A multi-dimensional data cube that includes both 3D spatial and spectral data may be obtained by scanning a target area from a single face (i.e., direction) rather than a point by point evaluation of the target area from multiple faces to get a unique solution. The relatively reduced level of scanning may reduce the cost, increase durability, and increase accuracy, among other advantages.

Figure 6:
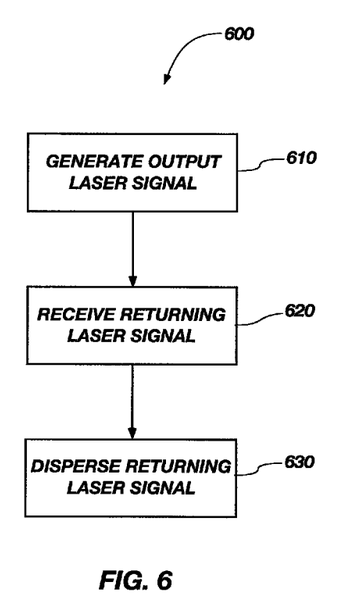
FIG. 6 is a flowchart illustrating a method for obtaining hyper-spectral imaging data correlated with spatial data.

FIG. 6 is a flowchart 600 illustrating a method for obtaining hyper-spectral imaging data correlated with spatial data. At operation 610, an output laser signal may be generated toward a target area. Generating the output laser signal toward the target area may include transmitting a pulsed laser in a direction of the target area along the z-axis.

At operation 620, a returning laser signal may be received from the target area. The returning laser signal may include information that can used to determine chemical composition, particle size, and other similar information related to objects within the target area. For example, the returning laser signal may be split into different components such as a Raman signal and a Rayleigh signal.

At operation 630, the returning laser signal may be dispersed into a plurality of wavelengths within a field of view of an array of detector elements. The array of detector elements may have a plurality of columns and rows of light sensitive elements. The returning laser signal may be optically converted from one form to a linear distribution of light. The returning laser signal may also be dispersed into a plurality of wavelengths such that each column of the array may view the plurality of wavelengths corresponding to a spatial location along the x-axis of the target area. The number of wavelengths in the plurality may be relatively large in order to produce a hyper-spectral image of the target area. In addition to receiving spectral data by dispersing the wavelengths of the returning laser signal, further information related to the spatial data may be received. For example, the spatial location of the target area in the z-axis may be determined through a conversion of a time delay between generating the output laser signal and receiving the returning laser signal.

Although one output laser signal is described as being generated, embodiments of the present invention may include generating additional output laser signals toward the target area at different locations along the y-axis of the target area. Additional returning laser signals may be generated through interactions of the additional output laser signals, and the additional returning laser signals received and dispersed as previously stated. As a result, locations of spectral data can be determined along the y-axis of the target area as multiple data sets are obtained based, at least in part by, determining a relative location of generating output laser signals relative to each other.

With the spectral data and the spatial data, a multi-dimensional data cube may be arranged in which the spectral data includes data corresponding to the plurality of wavelengths detected by the array of detector elements, and the spatial data includes data corresponding to locations on the x-axis, y-axis, and z-axis of the target area where the respective spectral data was detected.

Figure 7:
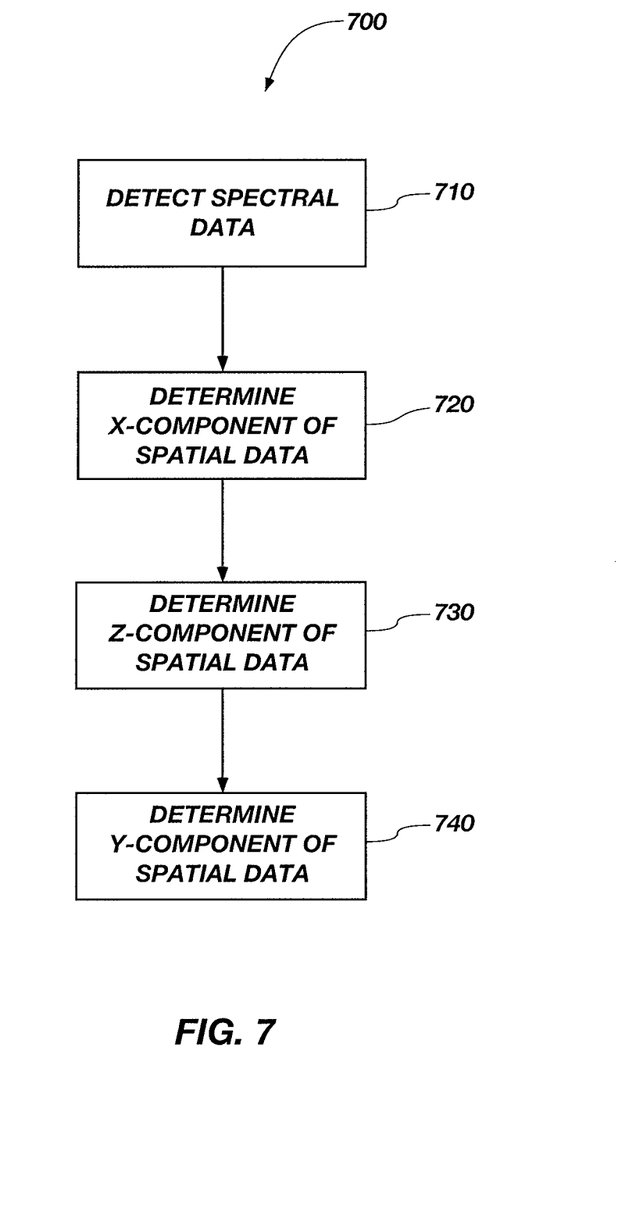
FIG. 7 is a flowchart illustrating a method for obtaining spatial and spectral data in a target area.

FIG. 7 is a flowchart 700 illustrating a method for obtaining spatial and spectral data in a target area. At operation 710, the spectral data may be detected. The spectral data may be detected by projecting a plurality of separated wavelengths of a returning LIDAR signal onto columns of a LIDAR detector array. At operation 720, the x-component of the spatial data may be determined. For example, the x-component of the spatial data may be determined by correlating locations within rows of the LIDAR detector array with an x-axis of a target area. At operation 730, the z-component of the spatial data may be determined. For example, the z-component of the spatial data may be determined by correlating a time delay of the returning LIDAR signal with the z-axis of the target area in a direction of propagation for the returning LIDAR signal. At operation 740, the y-component of spatial data may be determined. For example, the y-component of spatial data may be determined by correlating a location of the LIDAR detector array with a y-axis of the target area.

Figure 8:
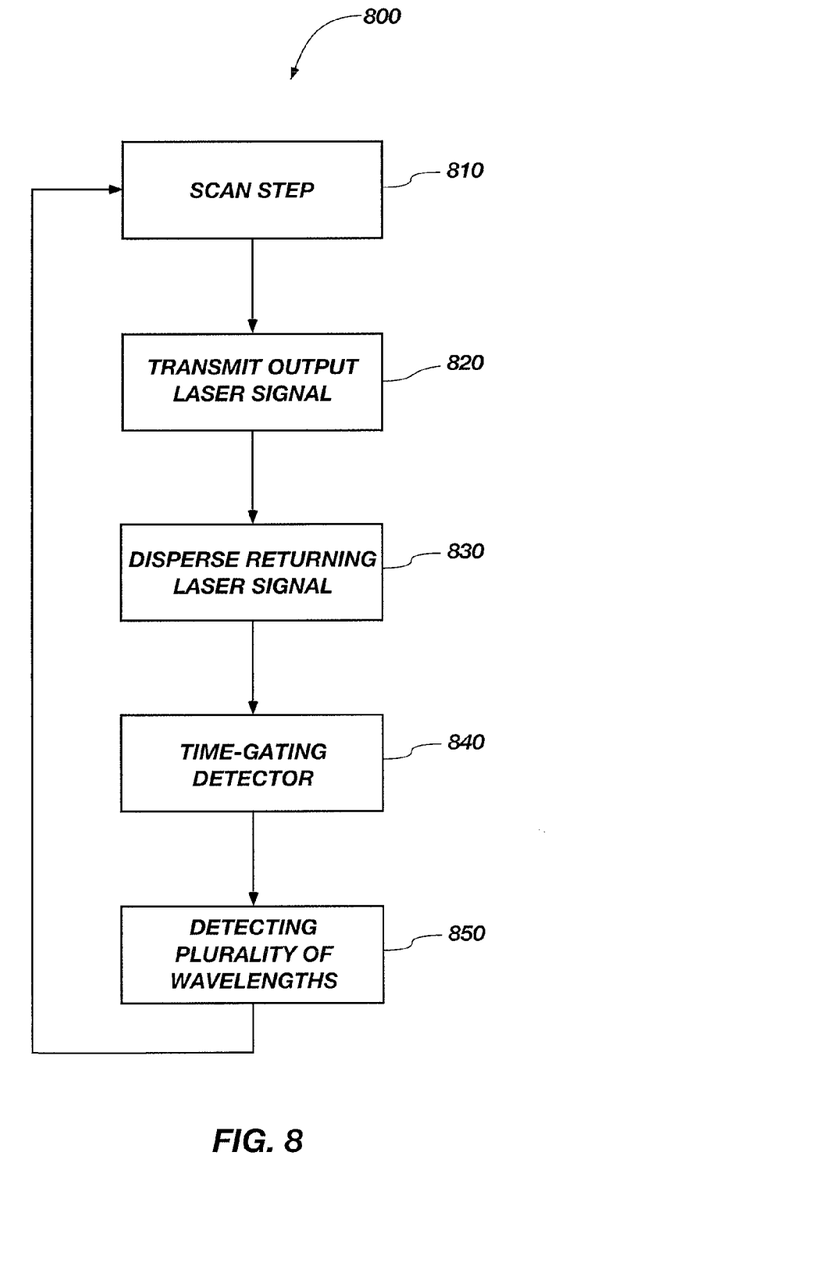
FIG. 8 is a flowchart illustrating another method of scanning a LIDAR signal over a target area.

FIG. 8 is a flowchart 800 illustrating another method of scanning a LIDAR signal over a target area. At operation 810 a first of a plurality of scan steps may be initiated. The plurality of scan steps may occur at different locations along a y-axis of a target area. Each scan step may include a plurality of operations. At operation 820, an output laser signal may be transmitted along a z-axis of the target area. The output laser signal may be a pulsed laser of a desired wavelength and intensity. At operation 830, the returning laser signal from the target area may be dispersed into a spectrum of a plurality of wavelengths. The returning laser signal may include information that can used to determine chemical composition, particle size, and other similar information related to objects within the target area. For example, the returning laser signal may be split into different components such as a Raman signal and a Rayleigh signal.

At operation 840, detectors of the LIDAR apparatus may be time-gated at time intervals after transmitting the output laser signal. Time gating may include enabling the detectors to detect light projected thereon at desired time instances. Time gating may further include synchronizing a plurality of detectors within the LIDAR apparatus if such a plurality of detectors is present for the particular embodiment. The time gating may contribute to determining spatial data along the z-axis of the target area by converting the timing into a distance that the laser has propagated along the z-axis. At operation 850, the plurality of wavelengths may be detected by the plurality of detectors during the time intervals. In order for detection to occur, the plurality of detectors may receive the spectrum of the plurality of wavelengths into columns of an array of detector elements of each detector, wherein the columns correspond to different locations along an x-axis of the target area. Additional scan steps may be initiated at operation 810. The additional scan steps may occur at different locations of the detectors in the y-direction of the target area. For example, the detectors may be mounted on a movable platform, on a stationary platform within a moving object, or a combination thereof. The movement of the detectors may be in the y-direction of the target area, which may contribute to determining spatial data along the y-axis.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the invention as defined by the following appended claims and their legal equivalents. For example, elements and features disclosed in relation to one embodiment may be combined with elements and features disclosed in relation to other embodiments of the present invention.

What is claimed is:

1. A Light Detection and Ranging (LIDAR) apparatus, comprising:
    a laser generator configured to generate an output laser signal toward a target area;
    at least one detector configured as an array of light sensitive elements, the array including a plurality of rows and columns of light sensitive elements;
    at least one wavelength dispersion element positioned in a return path of a returning laser signal returning from the target area, the at least one wavelength dispersion element configured to separate wavelengths of the returning laser signal onto the plurality of rows and columns of the array, wherein the columns of the plurality of columns of the array are associated with the separated wavelengths that correspond with a position along a row of the array, the position along the row of the array corresponding with a spatial position of the target area along a first axis; and
    a processor including control logic configured to calculate three-dimensional (3D) spatial data and combine the 3D spatial data with spectral data including the separated wavelengths, wherein the 3D spatial data includes:
    data associated with the first axis;
    data associated with a second axis based, at least in part, on a position in a direction of movement of the at least one detector; and
    data associated with a third axis based, at least in part, on a time conversion of a time interval between reception of the returning laser signal and generation of the output laser signal.

2. The LIDAR apparatus of claim 1, wherein the rows of the plurality of rows of the array are oriented in a direction orthogonal to a direction of movement of the at least one detector.

3. The LIDAR apparatus of claim 1, wherein the at least one wavelength dispersion element is configured to pass one of Raman data and Rayleigh data to the at least one detector and the spectral data includes at least one of Raman data and Raleigh data obtained from the returning laser signal.

4. The LIDAR apparatus of claim 1, further comprising:
    at least one additional detector configured as an additional array of light sensitive elements, the additional array including a plurality of additional rows and columns of light sensitive elements; and
    at least one additional wavelength dispersion element associated with the at least one detector, wherein the at least one additional wavelength dispersion element is configured to separate the returning laser signal into a column of separated wavelengths associated with a position of a row in a direction perpendicular to a direction of the at least one additional detector.

5. A Light Detection and Ranging (LIDAR) apparatus, comprising:
    a laser generator configured to generate an output laser signal toward a target area;
    at least one detector configured as an array of light sensitive elements, the array including a plurality of rows and columns of light sensitive elements;
    at least one wavelength dispersion element positioned in a return path of a returning laser signal returning from the target area, the at least one wavelength dispersion element configured to separate wavelengths of the returning laser signal onto the plurality of rows and columns of the array, wherein the columns of the plurality of columns of the array are associated with the separated wavelengths that correspond with a position along a row of the array, the position along the row of the array corresponding with a spatial position of the target area along a first axis;
    at least one additional detector configured as an additional array of light sensitive elements, the additional array including a plurality of additional rows and columns of light sensitive elements; and
    at least one additional wavelength dispersion element associated with the at least one additional detector, wherein the at least one additional wavelength dispersion element is configured to separate the returning laser signal into a column of separated wavelengths associated with a position of a row in a direction perpendicular to a direction of the at least one additional detector;
    wherein the at least one wavelength dispersion element is configured to pass one of Raman data and Rayleigh data to the at least one detector, and the at least one additional wavelength dispersion element is configured to pass the other one of Raman data and Rayleigh data to the at least one additional detector.

6. The LIDAR apparatus of claim 4, wherein the at least one detector and the at least one additional detector are Flash LIDAR detectors.

7. The LIDAR apparatus of claim 4, wherein the at least one wavelength dispersion element and the at least one additional wavelength dispersion element each includes at least one diffraction grating.

8. The LIDAR apparatus of claim 1, further comprising optics configured to convert the returning laser signal from one form to a linear distribution of light.

9. The LIDAR apparatus of claim 8, wherein the optics include a parabolic reflector.

10. A method for obtaining hyper-spectral imaging data correlated with spatial data, the method comprising:
    generating, with a laser generator, a first output laser signal toward a target area;
    receiving, with at least one detector, a first returning laser signal from the target area;
    dispersing, with at least one wavelength dispersion element, the first returning laser signal into a plurality of wavelengths within a field of view of an array of detector elements to be detected thereby, wherein a column of the array views the plurality of wavelengths that correspond to a spatial location of the target area in a first axis; and calculating, with a processor, three-dimensional (3D) spatial data and combining the 3D spatial data with spectral data including the separated wavelengths, wherein the 3D spatial data includes:
data associated with the first axis;
data associated with a second axis based, at least in part, on a position in a direction of movement of the at least one detector; and
data associated with a third axis based, at least in part, on a time conversion of a time interval between reception of the returning laser signal and generation of the output laser signal.

11. The method of claim 10, further comprising:
generating at least one second output laser signal toward the target area at a different location from the first output laser signal;
receiving at least one second returning laser signal from the target area; and
dispersing the at least one second returning laser signal into a plurality of wavelengths within the field of view of the array of detector elements, wherein a column of the array views the plurality of wavelengths that correspond to a spatial location of the target area in the first axis.

12. The method of claim 10, further comprising arranging data as a multi-dimensional data cube including spectral data and spatial data, wherein the spectral data includes data corresponding to the plurality of wavelengths detected by the array of detector elements, and the spatial data includes data corresponding to locations on the first axis, the second axis, and the third axis when the respective spectral data is detected.

13. The method of claim 10, further comprising directing a Raman component of the first returning laser signal to the array of detector elements and directing a Rayleigh component of the first returning laser signal to another array of detector elements.

14. The method of claim 10, further comprising optically converting the first returning laser signal from one form to a linear distribution of light.

15. The method of claim 10, wherein calculating the 3D spatial data includes:
determining an x-component of the spatial location by correlating locations in rows of the array of detector elements with the first axis of the target area;
determining a z-component of the spatial location by correlating a time delay of the returning laser signal with the third axis of the target area in a direction of propagation for the returning laser signal; and
determining a y-component of the spatial location by correlating a location of the LIDAR detector array with the second axis of the target area.

16. The method of claim 10, further comprising scanning the target area with the first output laser signal over a plurality of scan steps at different locations along the second axis of the target area, wherein each of the generating the first output laser signal, the receiving the first returning laser signal, and the dispersing the first returning laser signal are included in each scan step of the plurality of scan steps.

17. The method of claim 16, wherein generating a first output laser signal toward the target area comprises generating the first output laser signal toward the target area by transmitting the first laser output signal along the third axis of the target area.

18. A method for obtaining hyper-spectral imaging data correlated with spatial data, the method comprising:
generating, with a laser generator, a first output laser signal toward a target area;
receiving, with at least one detector, a first returning laser signal from the target area;
dispersing, with at least one wavelength dispersion element, the first returning laser signal into a plurality of wavelengths within a field of view of an array of detector elements to be detected thereby, wherein a column of the array views the plurality of wavelengths that correspond to a spatial location of the target area in a first axis; and
scanning the target area with the first output laser signal over a plurality of scan steps at different locations along a y-axis of the target area, wherein each of the generating the first output laser signal, the receiving the first returning laser signal, and the dispersing the first returning laser signal are included in each scan step of the plurality of scan steps;
wherein generating a first output laser signal toward the target area comprises generating the first output laser signal toward the target area by transmitting the first laser output signal along a z-axis of the target area; and
wherein each scan step further includes:
time-gating at least one detector at time intervals after transmitting the output laser signal; and
detecting the plurality of wavelengths during the time intervals, wherein the at least one detector receives a spectrum of the plurality of wavelengths into columns of an array of detectors of the at least one detector, the columns corresponding to different locations along an x-axis of the target area.

* * * * *